United States Patent [19]
Yunoki

[11] Patent Number: 4,742,404
[45] Date of Patent: May 3, 1988

[54] MAGNETIC RECORDING/REPRODUCTION APPARATUS

[75] Inventor: Yutaka Yunoki, Kunitachi, Japan

[73] Assignee: Olympus Optical Co., Ltd., Tokyo, Japan

[21] Appl. No.: 796,573

[22] PCT Filed: Mar. 13, 1985

[86] PCT No.: PCT/JP85/00123

§ 371 Date: Oct. 28, 1985

§ 102(e) Date: Oct. 28, 1985

[87] PCT Pub. No.: WO85/04277

PCT Pub. Date: Sep. 26, 1985

[30] Foreign Application Priority Data

| Mar. 13, 1984 | [JP] | Japan | 59-47865 |
| Mar. 13, 1984 | [JP] | Japan | 59-47866 |
| Mar. 13, 1984 | [JP] | Japan | 59-47867 |
| Mar. 13, 1984 | [JP] | Japan | 59-47868 |
| Mar. 13, 1984 | [JP] | Japan | 59-47869 |
| Mar. 13, 1984 | [JP] | Japan | 59-47870 |

[51] Int. Cl.$^4$ .......................... G11B 5/03; G11B 5/265
[52] U.S. Cl. ........................................ 360/66; 360/121
[58] Field of Search ............... 360/66, 77, 120, 121, 360/118, 122, 103

[56] References Cited

U.S. PATENT DOCUMENTS

| 3,311,710 | 3/1967 | Murphy et al. ............... 360/121 |
| 3,806,902 | 4/1974 | Drees et al. ................... 360/121 |
| 4,290,088 | 9/1981 | Beecroft ........................ 360/66 |
| 4,330,804 | 5/1982 | DeMoss ......................... 360/122 |
| 4,367,565 | 1/1983 | Strumsta et al. .............. 360/66 |
| 4,531,170 | 7/1985 | Takei et al. ................... 360/121 |

FOREIGN PATENT DOCUMENTS

| 44-17180 | 7/1969 | Japan . |
| 50-134614 | 4/1974 | Japan . |
| 49-45711 | 5/1974 | Japan . |
| 52-62415 | 5/1977 | Japan . |
| 54-10443 | 5/1979 | Japan . |
| 56-44483 | 10/1981 | Japan . |
| 59-2493 | 1/1984 | Japan . |

Primary Examiner—Vincent P. Canney
Attorney, Agent, or Firm—Frishauf, Holtz, Goodman & Woodward

[57] ABSTRACT

A magnetic recording/reproduction apparatus wherein a pulse corresponding to rotation of a magnetic disk is obtained by detecting a PG yoke signal as a rotational position detection index in the disk by a PG coil, and recording/reproduction control is performed by a control circuit or the like for erase recording/reproduction control in accordance with the pulse. Erase and recording/reproduction operations of data are performed with respect to the disk by a composite magnetic head controlled by the erase recording/reproduction control circuit. The composite magnetic head has an erase gap and a read/write gap integrally provided and separated from each other in the longitudinal direction of a recording track.

12 Claims, 15 Drawing Sheets

F I G. 19
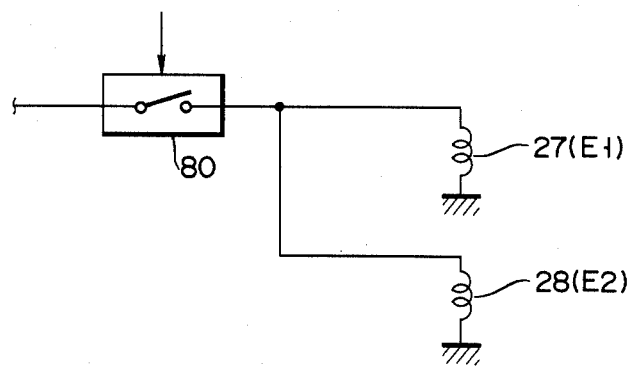
F I G. 21
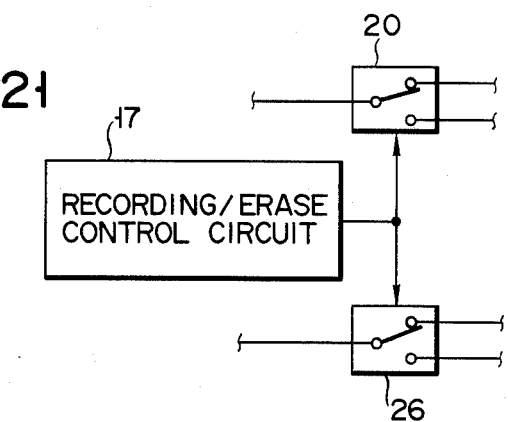
F I G. 22
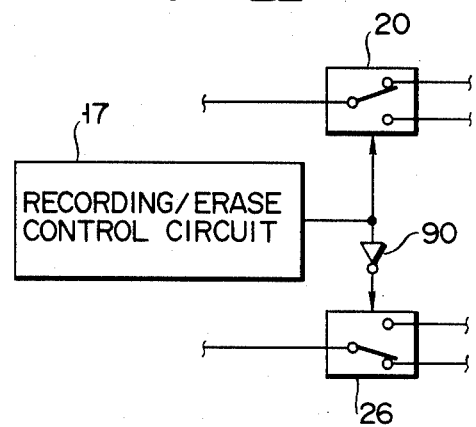

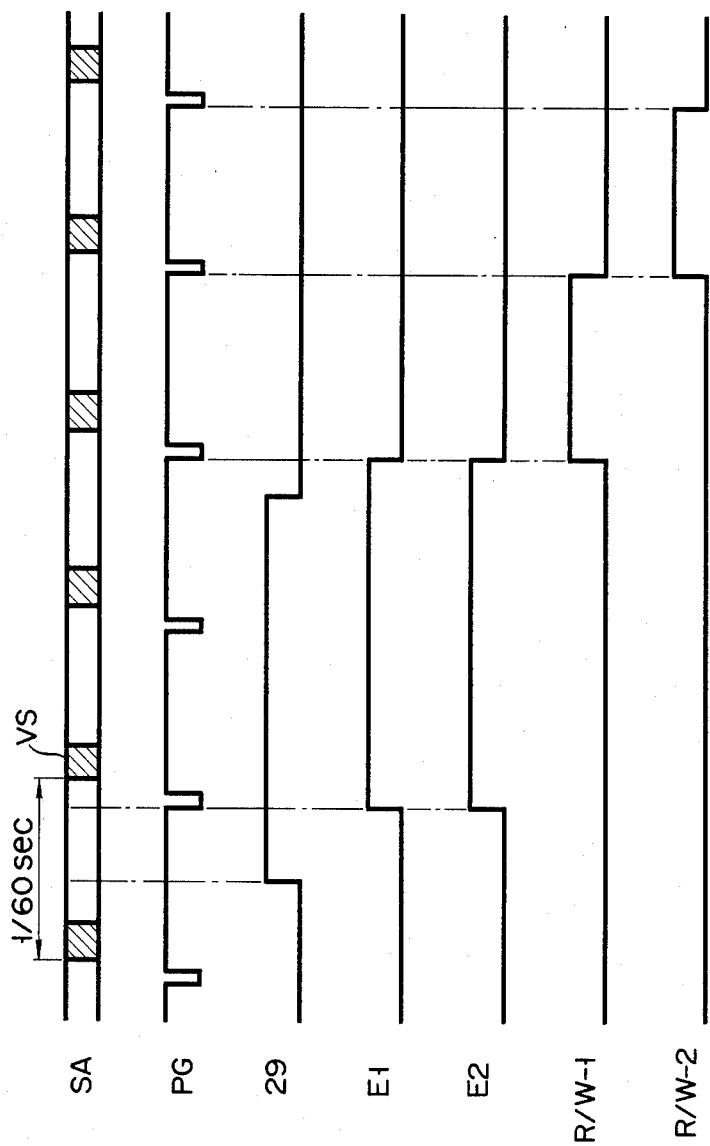

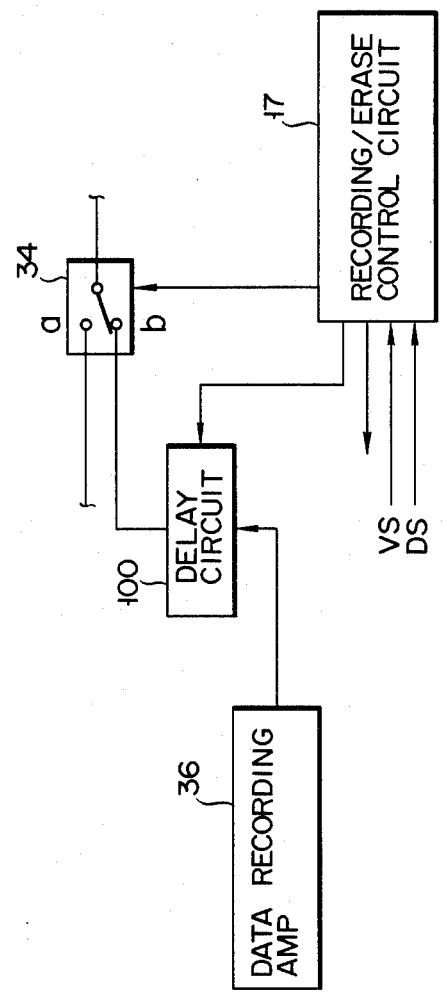

MAGNETIC RECORDING/REPRODUCTION APPARATUS

TECHNICAL FIELD

The present invention relates to a magnetic recording/reproduction apparatus used, e.g., in an electronic camera for recording a still image or in a disk apparatus for recording digital data and, more particularly, to an improvement in data erase means and data read/write control means for a magnetic disk.

BACKGROUND ART

Conventionally, in a magnetic recording/reproduction apparatus of this type particularly for a compact electronic camera, recording and reproduction decks are separately provided. However, in such an apparatus, reproduction and re-recording cannot be performed immediately after a recording operation. Therefore, the conventional apparatus cannot satisfy the demand of a user for immediately reproducing a recorded image, and if a failure is found, immediately starting re-recording. Digital data recording has the same problem as described above. A magnetic recording/reproduction apparatus which employs an integrated read/write head combining recording and reproduction heads (to be referred to as a read/write head hereinafter) and incorporates a recording/reproduction circuit is proposed as an apparatus which is free from the above problem to a certain extent. With this magnetic recording/reproduction apparatus, reproduction and re-recording immediately after recording are enabled. Although image data can be reproduced and re-recorded immediately after recording, since no erase head is incorporated, previously recorded data cannot be erased, that is, immediate re-recording cannot be performed. The major reason why such an apparatus does not incorporate an erase head is as follows. First, in the case of digital recording, since so-called overwriting is enabled, no erase head is needed. Second, in a compact electronic camera, all the parts must be rendered compact and part installation space of the apparatus is considerably limited. Therefore, it is difficult to allocate space for installing an erase head requiring a relatively large installation space.

Even if there were no problem in space and an erase head could be installed together with the read/write head, the following problems still remain unsolved. When both the heads are incorporated in the apparatus using a compact magnetic disk as a recording medium having a diameter of, e.g., 2 inches, it is very difficult to set the heads at head positions which can realize optimum head touch states that is, positions at which the heads contact the surface of the disk recording medium in proper alignment with its circular recording tracks. As a result, so-called spacing loss is increased. When high-density recording with a wavelength on the order of 0.5 $\mu$m or less is performed, spacing loss due to head touch states of the heads must be reduced to a mininum. However, as described above, since optimum head touch states cannot be realized, spacing loss is increased, and as a result, high-density recording cannot be performed.

Furthermore, in an image recording method, a frame recording method using 2 tracks is proposed. In a compact magnetic disk apparatus which performs recording in the frame recording mode, two erase heads are required in addition to two read/write heads. In this case, four heads must be installed in the limited space of a deck. Therefore, difficulties associated with head installation space and in optimum head touch are exacerbated. In this manner, since various difficulties are presented in incorporating the erase head in the apparatus, image data erasure is carried out by a separate erase apparatus in practice. The above-mentioned demand of a user for immediately reproducing a recorded image and for re-recording it if a failure is found has not yet been satisfied.

A gap width and a track width of an erase head must be set to be wider than those of a read/write head, and when the erase head is close to the read/write head, crosstalk may increase. Therefore, it is conventionally considered that the erase and read/write heads cannot be integrated in view of recording/reproduction performance.

It is therefore an object of the present invention to provide a magnetic recording/reproduction apparatus suitable for a compact electronic camera which can satisfactorily reproduce various data such as image data without increasing crosstalk and spacing loss, and which comprises a composite magnetic head which can perform the re-recording operation immediately after the recording operation, and a control means for a selective recording means corresponding to types of recording data, a successive recording means on a single track and a double recording means and the like.

DISCLOSURE OF INVENTION

In order to achieve the above object, the present invention is characterized by the following arrangement. A magnetic recording/reproduction apparatus according to the present invention comprises a composite magnetic head having a plurality of sets of erase and read/write gaps which are provided substantially along the moving direction relative to the magnetic recording medium so as to be separated from each other, and are arranged in parallel so as to correspond to at least two adjacent tracks on the magnetic recording medium. As a preferred embodiment of the composite magnetic head, the read/write gaps are set to be on a radius connecting the center of the rotating magnetic recording medium and the detection center of a sensor for detecting an index provided on the recording medium. The apparatus of the present invention is characterized by comprising, in a magnetic recording/reproduction apparatus using a magnetic disk as a recording medium, a control means for controlling the composite magnetic recording head using an erase read/write means which samples a pulse corresponding to rotation of the disk and is operative in accordance with the sampled pulse; a selective recording means for discriminating whether or not recording data supplied to the composite magnetic head is image data and for selectively supplying image data or other data in accordance with the discrimination result; a successive recording means for successively repeating erase and recording operation cycles in a single track when a successive recording instruction signal is supplied to the composite magnetic head; and a double recording means for causing the composite magnetic head to record 2-field images on two adjacent tracks during two successive revolutions of the magnetic disk and for instructing the composite magnetic head to erase one of the 2-field images and to record another 1-field image on the erased portion in response to a double recording instruction signal.

In the magnetic recording/reproduction apparatus with the above arrangement, since read/write and erase gaps are integrally formed and a composite magnetic head for realizing optimum head touch is controlled by a control system having various control functions, recording/reproduction/erasure by the read/write and erase gaps can always be satisfactorily performed.

Therefore, a magnetic recording/reproduction apparatus suitable for a compact electronic camera which can reproduce various data such as image data without increasing crosstalk and spacing loss, and which can perform a re-recording operation immediately after a recording operation, and which comprises various recording functions such as selective recording corresponding to types of recording data, successive recording on a single track, double recording and the like can be provided.

BRIEF DESCRIPTION OF THE DRAWINGS

FIGS. 1 and 2 show a first embodiment of the present invention, in which FIG. 1 is a schematic view showing a head arrangement state and FIG. 2 is a plan view of a composite magnetic head structure.

FIGS. 3 to 6 show a second embodiment of the present invention, in which FIG. 3 is a schematic view showing a head arrangement state, FIG. 4 is a plan view showing a composite magnetic head structure, FIG. 5 is a block diagram showing an arrangement of a control system which allows the composite magnetic head shown in FIG. 4 to perform recording and erase operations, and FIG. 6 is a timing chart showing operations of respective parts in the control system shown in FIG. 5.

FIGS. 7 and 8 show a third embodiment of the present invention, in which FIG. 7 is a block diagram showing an arrangement of a control system which enables one to selectively perform image recording and data recording, and FIG. 8 is a timing chart showing operations of respective parts in the control system shown in FIG. 7.

FIGS. 10 to 12 show a fifth embodiment of the present invention, in which FIG. 10 is a block diagram showing an arrangement of a control system which enables the composite magnetic head shown in FIG. 4 to perform successive recording and double recording, FIG. 11 is a timing chart showing successive recording operations of the control system shown in FIG. 10, and FIG. 12 is a timing chart showing a double recording operation of the control system shown in FIG. 10.

FIGS. 13 to 15 show an example of a surface shape of the composite magnetic head shown in FIGS. 2 and 4, in which FIG. 13 is a front view, FIG. 14 is an end face view, and FIG. 15 is a side view.

FIG. 19 is a partial diagram showing a modification of the control system shown in FIG. 5.

FIG. 20 is an operation timing chart when the control system, is configured as in FIG. 19.

FIGS. 21 and 22 are partial diagrams showing other modifications of the control system shown in FIG. 5.

FIG. 24 is a partial diagram showing a modification of the control system shown in FIG. 7.

BEST MODE FOR CARRYING OUT THE INVENTION

Figure 1:
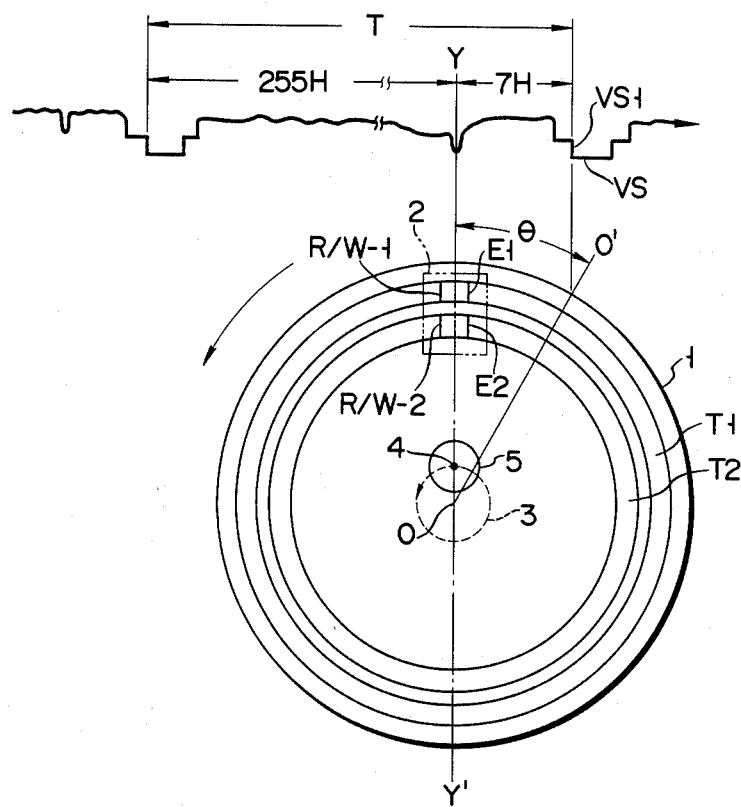
Figure 2:
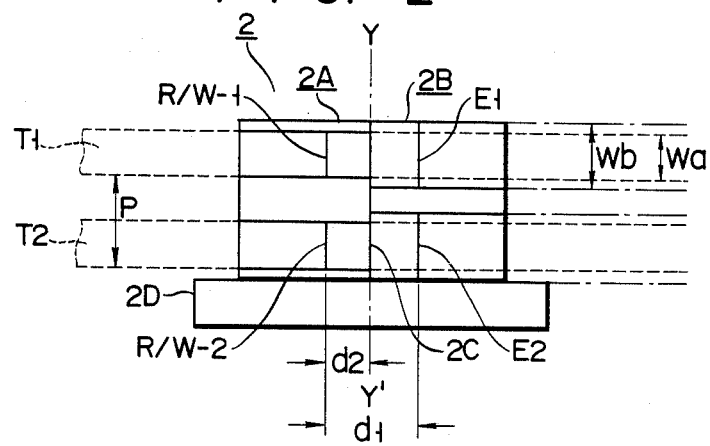

FIGS. 1 and 2 are respectively, a schematic view showing a head arrangement state according to a first embodiment of the present invention and a view showing the head structure. Referring to FIG. 1, reference numeral 1 denotes a rotating magnetic disk which is rotated counterclockwise as indicated by an arrow about a point O at a rotational speed of 3,600 RPM (in the case of NTSC) by a motor (not shown). Recording tracks T1, T2, . . . are concentrically formed on the recording surface of the magnetic disk 1 by a composite magnetic head 2. A PG yoke 4 as a rotating position detection index of the disk 1 is provided at a position on the outer periphery of a hub 3 in, a central portion of the disk 1. A pulse generator or PG coil 5 is provided as a pulse detection means at a position along the rotation path of the PG yoke 4, on the main body (not shown) of a recording/reproduction apparatus. The PG coil 5 is arranged to face the nonrecording surface side of the magnetic disk 1, e.g., at a side opposite to the composite magnetic head 2, and samples a pulse signal induced by interlinkage with magnetic flux generated by the PG yoke 4 on the disk upon rotation of the magnetic disk 1.

The pulse generator or PG coil 5 is formed by winding a wire around a magnetic core, PG coil 5 is provided in the recording/reproduction into which magnetic disk 1 is loaded. For example, it is located above the path along which PG yoke 4 (magnetic piece) is rotated. As mentioned, PG yoke 4 is provided on th eouter periphery of hub 3 in the center of the magnetic disk 1, and is used as a rotational position-detecting index. PG coil 5 is out of contact with magnetic disk 1 (which includes PG yoke 4), but faces magnetic disk 1 in the vicinity thereof.

Where PG yoke 4 comes to the position corresponding to the location of PG coil 5 as magnetic disk 1 rotates, PG coil 5 detects the magnetic flux generated from PG yoke 4 and outputs one pulse signal. This means that PG coil 5 outputs one pulse signal each time magnetic disk 1 makes one rotation. Therefore, the rotational position of magnetic disk 1 can be detected in the recording and reproduction modes, on the basis of the pulse signal.

Figure 3:
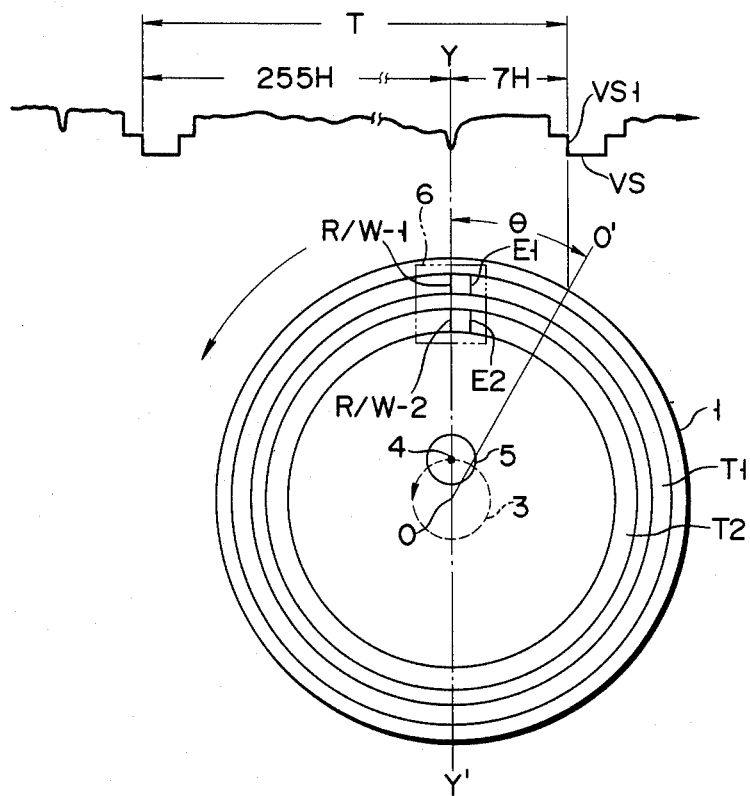

A "detection center", as referred to hereafter, may be regarded as being the same as the center of PG coil 5. In FIGS. 1 and 3, PG yoke 4 is shown as aligning with the detection center or the center of PG coil 5.

When still image data is recorded on the magnetic disk 1, in a field recording mode, still image data of different fields are recorded on the first and second tracks T1 and T2 and in a frame recording mode, still image data of two successive fields are recorded on the first and second tracks T1 and T2. In any mode, start and end points of recording correspond to a position of the PG yoke 4 shown in FIG. 1, that is, to a position of the PG yoke 4 when it reaches a line O-Y assuming that a line connecting the central point O of the magnetic disk 1 and the center of the PG coil 5 is given by Y-Y'. The composite magnetic head 2 is switched by a PG pulse obtained when the PG yoke 4 reaches the center of the PG coil 5. When an image is recorded, in the case of an NTSC signal, a 262-H (H is a horizontal line) signal is recorded on one track. At this time, a switching point is set at a point advanced by 7 H from a leading edge VS1 of a vertical sync signal VS. Therefore, the leading edge VS1 of the vertical sync signal VS is recorded at an angle O-O' shifted by $\theta\{360°\times(7/262)\}$ from the line O-Y as the switching point on the magnetic disk 1. As a result, a noise component generated at the switching point is present at a deviated position near an edge portion on a reproduced frame and can be virtually ignored.

FIG. 2 is a plan view showing the structure of the composite magnetic head 2 shown in FIG. 1. The composite magnetic head 2 is arranged with respect to the first and second tracks T1 and T2 so that various data such as digital data can be continuously recorded or reproduced without moving the head, and recorded data can be appropriately erased. That is, in the composite magnetic head 2, a first read/write gap R/W-1 and a first erase gap E1 corresponding to the first track T1 are provided substantially along the direction of movement relative to the magnetic disk 1 so as to be spaced by a predetermined distance d1 from each other along the longitudinal direction of the first track T1, and a second read/write gap R/W-2 and a second erase gap E2 corresponding to the second, track T2 are similarly provided to be spaced by the predetermined distance d1 from each other along a longitudinal direction of the second track T2.

In the method of manufacturing the composite head 2, a 2-track read/write head portion 2A at the left of the line Y-Y' and a 2-track erase head portion 2B at the right of the line Y-Y' are first prepared separately, and are integrally adhered to each other so as to sandwich a magnetic shield member 2C for preventing crosstalk therebetween, and the resultant structure is fixed to a head fixing base 2D. With this method, the composite magnetic head 2 can be easily manufactured.

Referring to FIG. 2, reference symbol P indicates a track pitch; Wa, a read/write gap width; and Wb, an erase gap width. The composite magnetic head 2 is fixed to the apparatus main body so that the junction portion sandwiching the magnetic shield member 2C as a head center is positioned on the line O-Y of FIG. 1. Thus, the read/write gaps R/W-1 and R/W-2 and the erase gaps E1 and E2 can provide substantially the same head touch with respect to the recording surface of the magnetic disk 1.

The composite magnetic head 2 need only be a single type, and can be treated as a conventional head with respect to space when incorporated in an electronic camera. A recording/reproduction circuit (not shown) is connected to the composite magnetic head 2, thereby appropriately performing recording, reproduction and erase operations.

In the first embodiment shown in FIGS. 1 and 2, the read/write gaps R/W-1 and R/W-2 of the composite magnetic head 2 are laterally shifted by the distance d2 (about ½ of the distance d1) from the line Y-Y'. Therefore, the head is shifted from the above-mentioned switching point by the distance d2. In addition, when the composite magnetic head 2 is moved in the radial direction of the disk 1, the inclination angle, i.e., the azimuth of the read/write gaps R/W-1 and R/W-2 with respect to the tracks T1, T2, ... is undesirably changed. In order to prevent this, the read/write gaps R/W-1 and R/W-2 must be inclined slightly in advance with respect to the line Y-Y'. However, in this case, since a positional relationship between the read/write gaps R/W-1 and R/W-2 and the erase gaps E1 and E2 requires high precision, it is hard to manufacture the head.

In the composite magnetic head 2 shown in FIGS. 1 and 2, since the magnetic shield member 2C is interposed between the head junction surfaces, the distance d1 between the read/write gaps R/W-1 and R/W-2 and the erase gaps E1 and E2 is increased. Therefore, it is relatively difficult to obtain optimum head touch.

Figure 4:
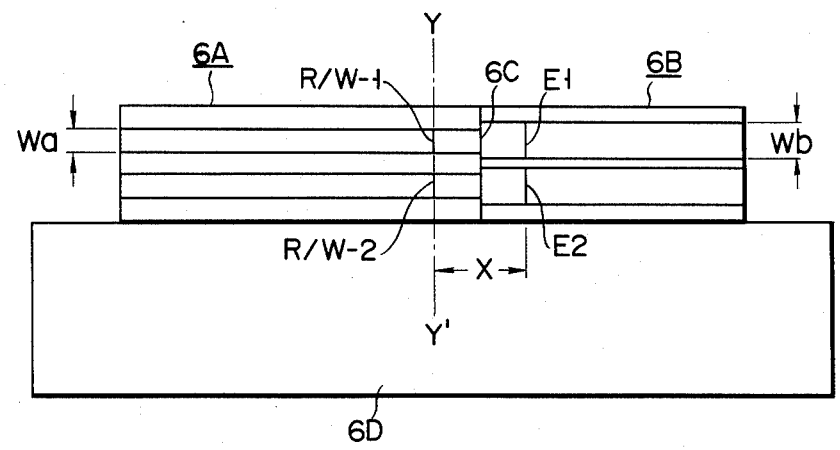

FIGS. 3 and 4 are respectively a schematic view showing a head arrangement state according to a second embodiment of the present invention free from the problem of the first embodiment and a view showing the head structure. The overall arrangement is the same as the first embodiment. However, in this embodiment, read/write gaps R/W-1 and R/W-2 of a composite magnetic head 6 are provided at the head center and are set to be on a line Y-Y'. Erase gaps E1 and E2 are provided at an upstream side of the read/write gaps R/W-1 and R/W-2 to be shifted by X ($=400$ μm: corresponding to a time difference of about 1 H of a video signal). Head touch is adjusted to become optimum on a line connecting the read/write gaps R/W-1 and R/W-2.

According to this embodiment, spacing loss in recording/reproduction is decreased and recording/reproduction performance can be improved as compared to the first embodiment. Head touch of the erase gaps E1 and E2 becomes poor as compared to the read/write gaps R/W-1 and R/W-2, but since a gap width Wb is larger than a gap width Wa of the read/write gaps R/W-1 and R/W-2, slight degradation in performance can be ignored. As will be described later, although the recording/reproduction operation is performed once during one revolution of the disk, the erase operation can be continuously performed during several revolutions of the disk 1, thereby correcting poor head contact of the erase gaps E1 and E2.

In this embodiment, since the read/write gaps R/W-1 and R/W-2 are located on the line Y-Y', when the composite magnetic head 6 is moved in the radial direction of the disk 1, the inclination angle (azimuth) of the gaps R/W-1 and R/W-2 with respect to the tracks is not changed. Therefore, azimuth loss cannot occur. Note that since the azimuth of the erase gaps E1 and E2 is not so greatly influenced for the above-mentioned reason, they can be provided substantially parallel to the read/write gaps R/W-1 and R/W-2. Therefore, the magnetic head of this embodiment allows easier manufacture than that of the first embodiment.

In order to improve head contact, the distance X between the read/write gaps R/W-1 and R/W-2 and the erase gaps E1 and E2 is decreased as small as possible, and a magnetic shield member 6C sandwiched between junction surfaces of a read/write head portion 6A and an erase head portion 6B, is formed to be as thin as possible. However, in this case, crosstalk between the read/write gaps R/W-1 and R/W-2 and the erase gaps E1 and E2 presents a problem. However, the problem of crosstalk can be overcome by optimally controlling recording/erase timings by a control system to be described later.

Figure 5:
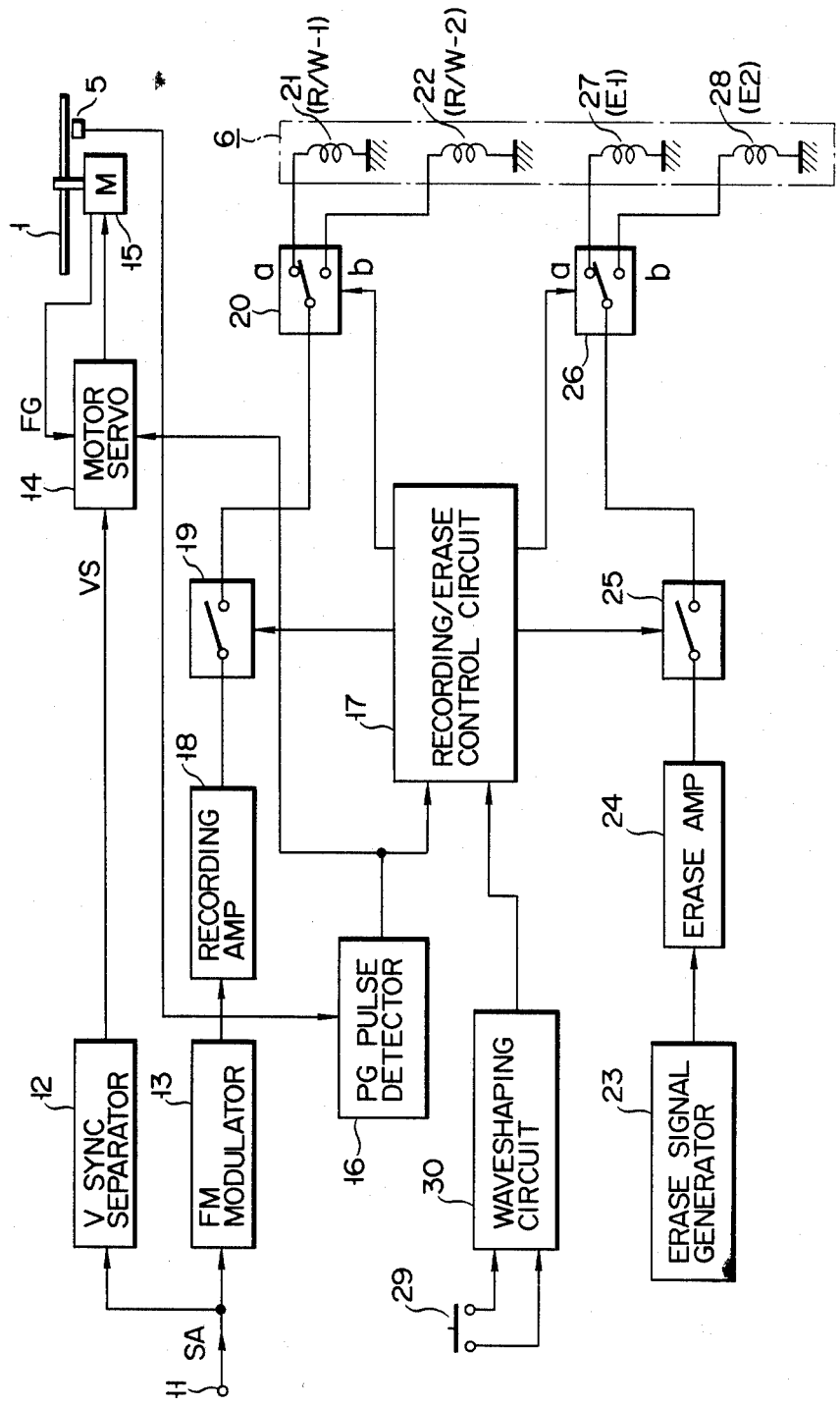

FIG. 5 is a block diagram showing an arrangement of a control system which enables the composite magnetic head 6 to perform recording and erase operations. The control system has a feature wherein a PG pulse used for switching the read/write head is also utilized for switching the erase head.

A terminal 11 shown at the left of the figure receives a video signal SA from an imaging apparatus having a solid-state image sensing element or an external TV signal generator. The video signal SA is supplied to a vertical sync separator 12 and an FM modulator 13. A vertical sync signal VS is extracted from the video signal SA supplied to the vertical sync separator 12, and is supplied to a motor servo circuit 14. The motor servo circuit 14 performs speed-servo control of a drive motor 15 in response to an FG pulse as a rotational speed signal from the disk drive motor 15 so as to keep it at a constant speed of 3,600 RPM. The magnetic disk 1 is loaded around a shaft of the motor 15, and a PG yoke provided near the center of the disk 1 is detected by the PG coil 5 so as to send 60 PG pulses per minute. The PG pulses are detected and waveshaped by a PG pulse detector 16, and then are supplied to the motor servo circuit 14. The waveshaped pulses are also supplied to a recording/erase control circuit 17 to be described later. The motor servo circuit 14 performs phase-servo control of the motor upon reception of the vertical sync signal VS and the PG pulse so that a time difference between the PG pulse and a leading edge VS1 of the vertical sync signal VS is kept to be 7 H (63.5 $\mu s \times 7$).

The video signal SA supplied to the FM modulator 13 is FM-modulated thereby and then is current-amplified by a recording amplifier 18. Thereafter, the amplified signal is supplied to excitation coils 21 and 22 corresponding to the read/write gaps R/W-1 and R/W-2 sequentially through switches 19 and 20.

An erase signal generated from an erase signal generator 23 comprising an oscillator is current-amplified by an erase amplifier 24, and is supplied to excitation coils 27 and 28 corresponding to the erase gaps E1 and E2 sequentially through switches 25 and 26.

The switches 19 and 25 are ON/OFF controlled by the control circuit 17. The switches 20 and 26 are also switched by the control circuit 17. When the signal generated by turning ON a switch 29 (release switch in the case of an electronic camera) is waveshaped by a waveshaping circuit 30 and is inputted as an operation instruction, the control circuit 17 is operated in synchronise with the PG pulse so as to control the switches 19, 20, 25 and 26.

Figure 6:
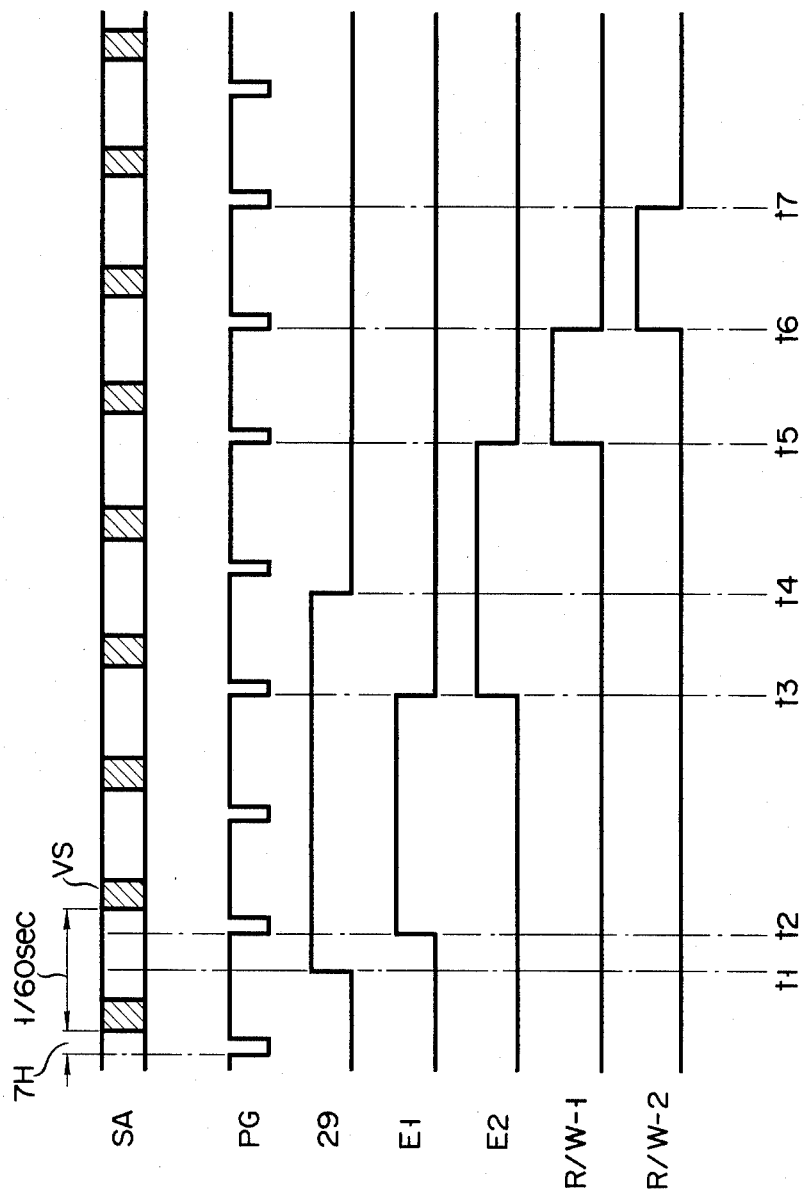

FIG. 6 is a timing chart showing the operation of the control system shown in FIG. 5. As shown in FIG. 6, assume a state wherein the vertical sync signal VS is supplied every 1/60 sec and the PG pulse is supplied prior to the leading edge of each vertical sync signal VS by 7 H. When the operation instruction switch 29 is turned ON at a time t1, a control signal is generated from the control circuit 17 at a time t2 at which the first PG pulse is supplied. In response to the control signal, the switch 25 is turned ON and the switch 26 is switched to a state shown in FIG. 7, i.e., a side a. Thus, the erase operation by the erase gap E1 is enabled. In this embodiment, during two revolutions of the disk 1, the erase operation by the erase gap E1 is performed. At a time t3, the switch 26 is switched to a side b. Thus, the erase operation by the erase gap E2 is similarly enabled. Note that when the operation instruction switch 29 is turned OFF at a time t4, the erase operation is ended by one cycle (four revolutions of disk 1) by the gaps E1 and E2, and the recording operation is enabled. When the PG pulse is supplied at a time t5, the erase operation is ended, and at the same time, the switch 19 is turned ON by the control signal from the control circuit 17, thereby switching the switch 20 to the side a. For this reason, the recording operation by the read/write gap R/W-1 during only one revolution of the disk 1 is enabled. Subsequently, the switch 20 is switched to the side b by the control signal from the control circuit 17 at a time t6 at which the next PG pulse is supplied.

In this manner, in 6 fields (1/10 sec), the erase and recording operations for two tracks are enabled. Since the gaps E1, R/W-1, E2 and R/W-2 are separately activated, crosstalk tends not to be generated. Since not only the read/write gaps R/W-1 and R/W-2 but also the erase gaps E1 and E2 are switched in synchronism with the PG pulses, so-called idle time is not generated. Furthermore, since the erase operation is performed over a period of at least one revolution of the disk 1, a nonerased portion is not formed. Note that when the OFF timing of the operation instruction switch 29 is shifted, the erase cycle can be set over a period of at least two revolutions.

A third embodiment of the present invention comprising, i.e., a means for selectively performing image recording and data recording will be described hereinafter. In an electronic camera, as shown in FIG. 1 or 3, a video signal is recorded on the first to 50th tracks T1 to T50 (the track T50 is not shown), and a data signal accompanying the video signal is recorded on the 52nd track T52, i.e., the so-called cue track (the track T52 is not shown, either). In a data recording apparatus comprising a disk having a track format common to an electronic camera, data recording is performed with respect to the first to 50th tracks T1 to T50. Therefore, a single disk can be commonly used for image recording and data recording. However, in this case, several problems occur. One is a problem of the recording amplifier. The image recording operation employs an FM modulation method, while the data recording operation employs a method of directly recording a binary signal and is saturated recording. Therefore, although the head can be commonly used for image recording and data recording, a circuit suitable for image recording and a circuit suitable for data recording are required as recording circuits. A means for identifying data to be recorded in the track as a video or data signal is also required. Furthermore, how to cope with phase synchronization between the disk revolution and an input signal with respect to the video and data signals is also a problem.

Figure 7:
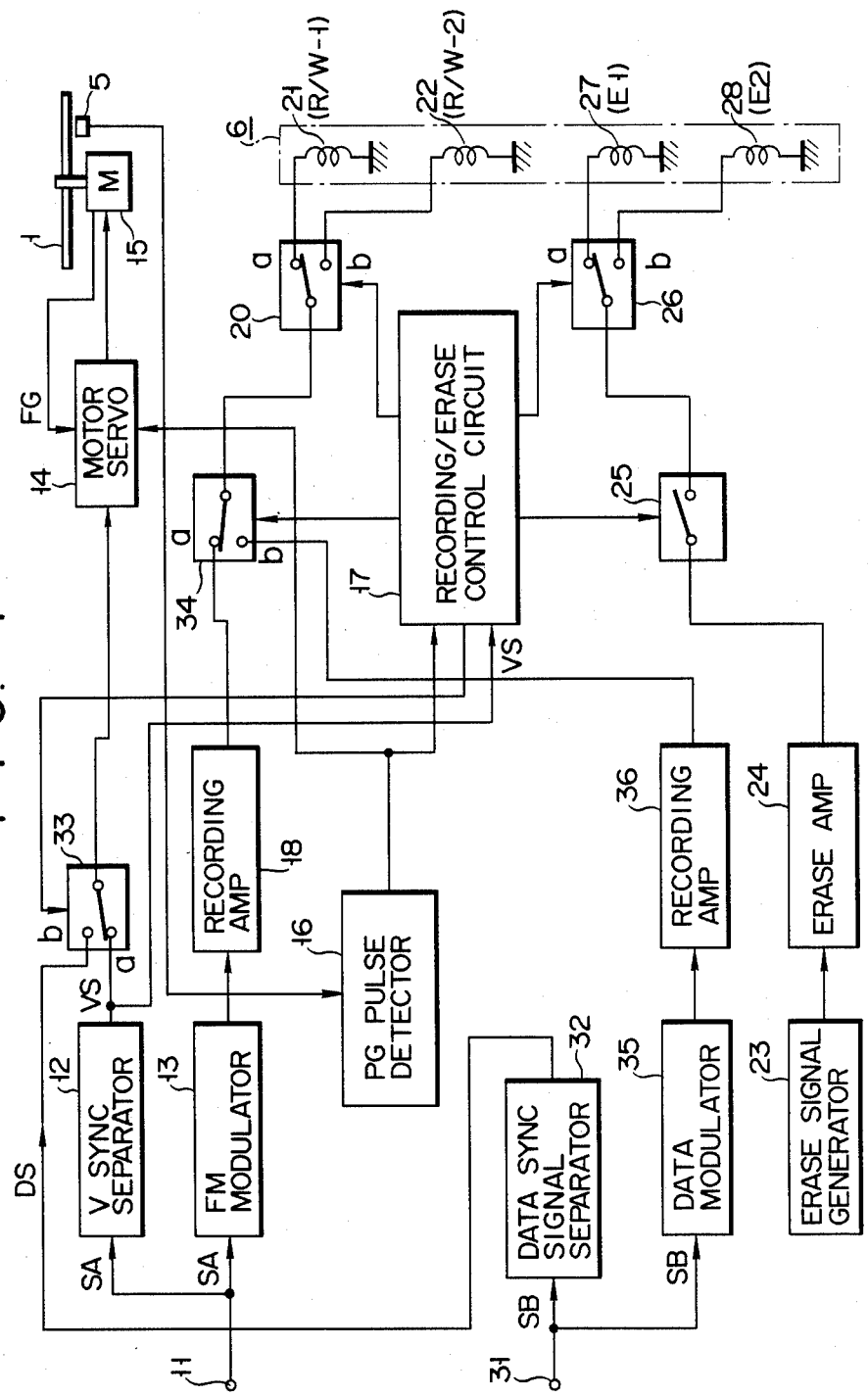

FIG. 7 is a block diagram showing the third embodiment of the present invention to solve the above problems. That is, FIG. 7 shows a block diagram of a circuit with which in order to selectively record video and data signals, the signal to be recorded is identified with a video or data signal, rotation of the disk is synchronized with the input signal, and the recording circuit suitable for the video or data signal is selected. The same reference numerals in FIG. 7 denote the same parts as in the circuit in FIG. 5, and a detailed description thereof will be omitted.

A video signal SA supplied to a terminal 11 includes vertical sync signals VS generated every 16.7 ms. On the other hand, a data signal SB supplied to a terminal 31 is a binary signal string, and includes sync signals DS generated every 16.7 ms. Note that the sync signals VS and DS have substantially the same phase. The vertical sync signal VS extracted by a vertical sync separator 12 and the data sync signal DS extracted by a data sync separator 32 are supplied to terminals a and b of a switch 33, respectively.

The video signal SA FM-modulated by an FM modulator 13 is amplified by a recording amplifier 18, and is supplied to a terminal a of a switch 34. The data signal is subjected to modulation such as NRZI modulation by a data modulator 35 and an error correction signal is added. Then, the data signal is amplified by a recording amplifier 36 and is supplied to a terminal b of the switch 34. The data signal is converted by the recording amplifier 36 into a recording current having a driving current waveform with a steep leading edge and a level at which the magnetic member of a magnetic disk 1 can be sufficiently saturated magnetically.

The vertical sync signal VS extracted from the video signal is also supplied to a recording/erase control circuit 17. When the vertical sync signal VS is continuously supplied to the control circuit 17, the control circuit 17 switches the switches 33 and 34 to the a sides while simultaneoulsy receiving the data and video signals SB and SA. In this embodiment, presence/absence of the video signal SA is checked by that of the vertical sync signal VS, and when the video signal SA is present, the video signal SA is recorded prior to the data signal SB.

When the switch 33 is switched to the a side, the vertical sync signal VS is supplied to a motor servo circuit 14 so as to lock the phase of the disk 1 with the video signal SA. The FM-modulated video signal amplified by the recording amplifier 18 is supplied to an excitation coil 21 or 22 corresponding to a read/write gap R/W-1 or R/W-2 of a composite magnetic head 6. The switching operation of the read/write gaps R/W-1 and R/W-2 and the erase gaps E1 and E2 of the head 6 is performed through switches 20 and 26 switched by the control signal synchronous with the PG pulse in the same manner as in the second embodiment. In this manner, the recording operation with respect to two tracks can be performed. When the composite magnetic head 6 is moved in the radial direction of the disk 1, successively supplied video signals SA are sequentially recorded on the corresponding tracks. When the composite magnetic head 6 is not moved, the successively supplied video signals are written after erasing the previous recording data, and only final data remains on the track.

Figure 8:
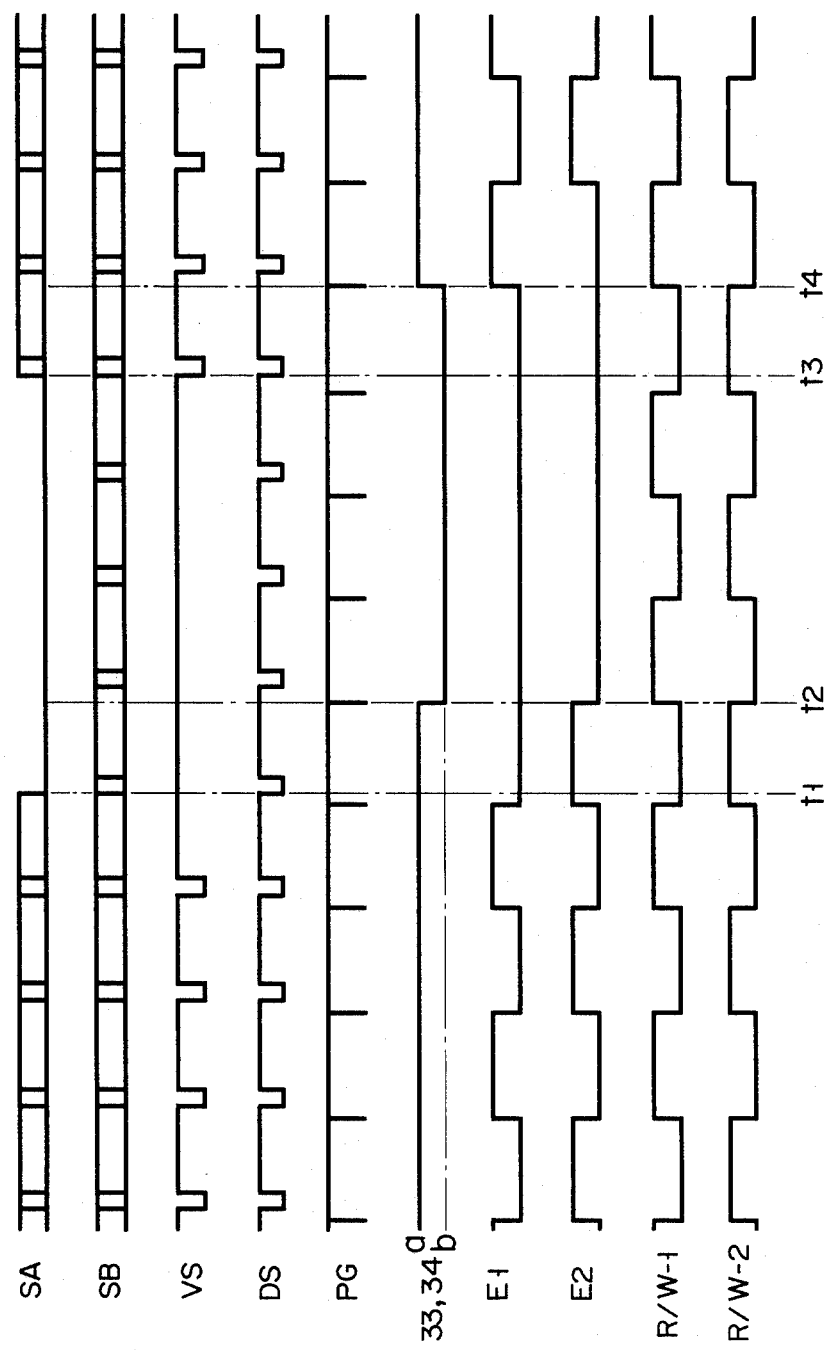

FIG. 8 is a timing chart showing the operation of the control system shown in FIG. 7. When the video signal SA is present, the vertical sync signal VS separated therefrom is supplied to the control circuit 17 at a constant interval. However, when the video signal SA is interrupted, e.g., at a time t1, the vertical sync signal is also interrupted. The switches 33 and 34 are then switched to the b sides by the control signal from the control circuit 17 at a time t2 at which the next PG pulse is detected. For this reason, the motor servo circuit 14 is set to respond to the data sync signal DS. The data signal SB is recorded on two tracks by the read/write gaps R/W-1 and R/W-2. Note that in the above-mentioned state, if the data signal SB is not present, the recording operation is not enabled.

Then, when the video signal SA is supplied again at a time t3, the vertical sync signal VS is supplied to the control circuit 17 again. Thus, the control circuit 17 switches the switches 33 and 34 to the a sides at a time t4 at which the next PG pulse is detected. Therefore, the video signal is supplied to the head 6 again, and the motor 15 is synchronized with the vertical sync signal VS, thereby synchronizing revolution of the disk 1 with the input signal. Note that since the data signal SB can be recorded by an overwrite method, the erase operation by the erase gaps E1 and E2 is omitted. The switch 25 is turned OFF in response to the PG pulse at the time t2 as the switching timing from the video signal SA to the data signal SB, and the switch 25 is turned ON in response to the PG pulse at a time t4 as the switching timing from the data signal SB to the video signal SA. The above operation can be performed without problems when the video and data signals are supplied not at the same time but sequentially. In the above explanation, a means for automatically switching the selective recording operation of the video and data signals has been described. However, the apparatus can be arranged so as to manually switch the switches 33 and 34.

A fourth embodiment of the present invention, i.e., an embodiment comprising another means for selectively performing image recording and data recording will be described hereinafter. The following video signal generators are considered.

(1) An imaging unit integrated in a recording/reproduction deck as an electronic camera.

(2) An imaging apparatus receiving a signal from a reference oscillator for a TV sync circuit as an external sync signal to be synchronized with an external device (e.g., external synchronizing type TV camera and the like).

(3) A video signal generating apparatus having its own sync signal (e.g., a videotex terminal such as a TV tuner).

On the other hand, the following apparatuses are considered as data signal generators.

(1) A cue track data signal generating unit for recording data accompanying a video signal on a 52th track.

(2) A data signal supply unit connected to recording-/reproduction equipment through a data bus from a personal computer or other data equipment.

As described above, when image recording or data recording is performed with respect to signals from respective units, an input signal to be synchronized with the phase servo of a disk rotating drive motor 15, and the timing of the ON/OFF operation of a recording current flowing in the head 6 must be determined.

Figure 9:
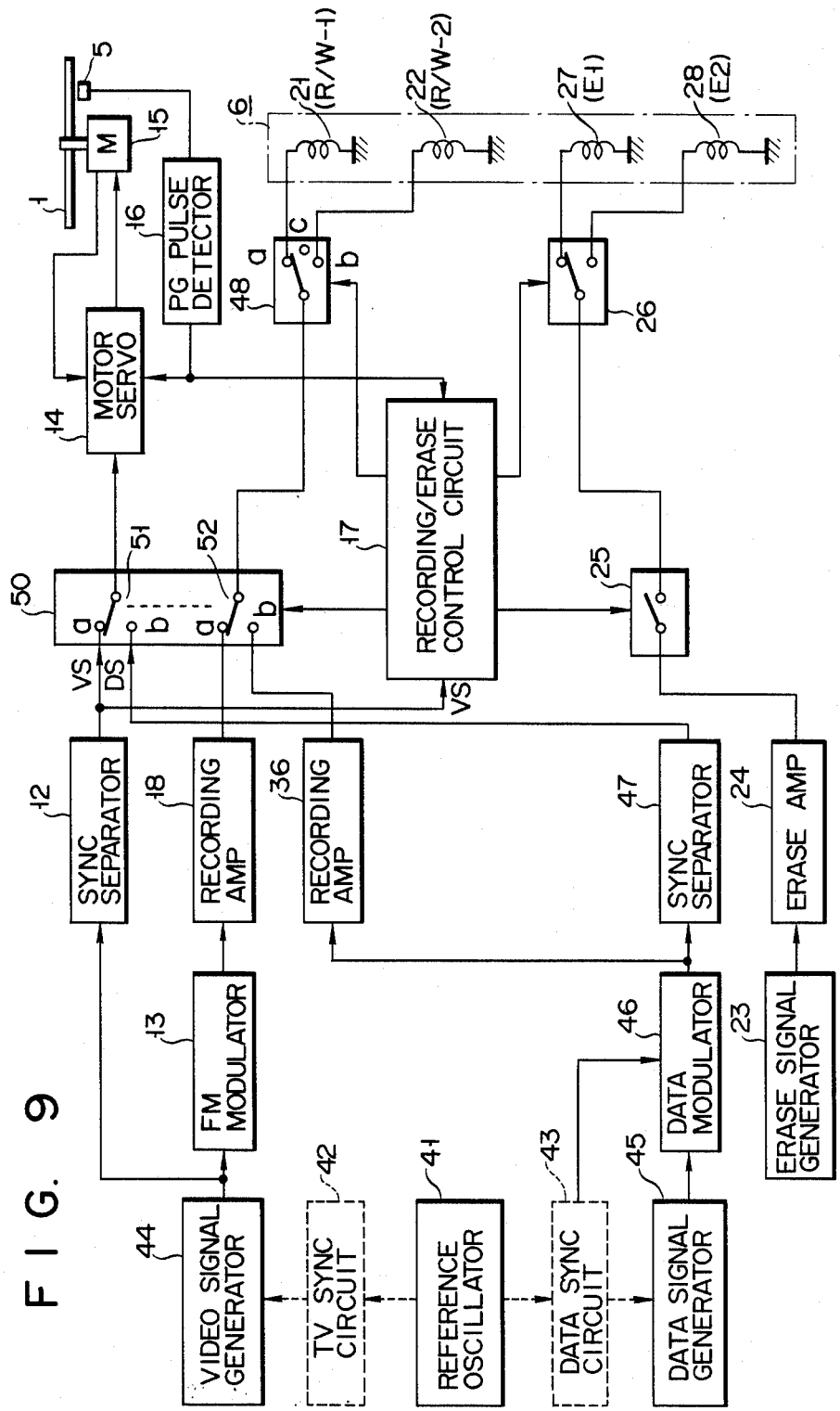
FIG. 9 is a block diagram showing an arrangement of a control system according to a fourth embodiment wherein a part of the control system shown in FIG. 7 is modified.

FIG. 9 is a block diagram showing an arrangement of a control system according to the fourth embodiment of the present invention to solve the above problems. FIG. 9 shows a block diagram of a circuit with which video or data recording is selected by a selection switch so as to switch a recording current, and at the same time, a phase sync signal supplied to a motor servo circuit 14 is switched so as to shorten the time required for switching from video recording to data recording or vice versa. The circuit shown in FIG. 7 can be applied only when a signal including a phase sync signal DS as a data signal SB is inputted. However, the circuit shown in FIG. 9 has a feature wherein arbitrary data can be inputted. The same reference numerals in FIG. 9 denote the same parts as in FIG. 7, and a detailed description thereof will be omitted.

A reference oscillator 41 is provided commonly for video and data systems. A clock, at color subcarrier frequency (fsc) 3.58 MHz sent from the reference oscillator 41, is supplied to a TV sync circuit 42 and a data sync circuit 43. The input clock to the TV circuit 42 is converted into a sync signal, and can be supplied to a video signal generator 44, as needed. The input clock to the data sync circuit 43, i.e., at the frequency fsc of 3.58 MHz is frequency-divided by the data sync circuit 43, and the obtained data clock signal can be supplied to a data signal generator 45, as needed, and is supplied to a data modulator 46.

The data modulator 46 incorporates a memory having a proper number of bits for receiving a data signal string of an arbitrary format from the data signal generator 45. The data signal written in the memory is read out in synchronism with the data clock from the data sync circuit 43, thereby forming a data signal provided with a sync signal DS, e.g., a self clocking data signal such as MFM or 4/5 NRZI. The data signal is supplied to a recording amplifier 36 and a data sync signal separator 47. The data sync separator 47 separates the sync signal DS added by the data modulator 46 by using a PLL circuit or the like, and supplies it to a selection switch 50 as a reference phase signal. Although not shown in FIG. 9, a circuit for separating the clock signal or the data sync signal included in the reproduction signal by the PLL circuit or the like so as to perform speed-servo or phase-servo control of a motor is used.

The sync signal VS included in the video signal from the video signal generator 44 is separated by a sync signal separator 12, and is supplied to the selection switch 50 as a reference phase signal. In the selection switch 50, a first switch 51 is interlocked with a second switch 52. These switches 51 and 52 are switched under the control of the control circuit 17.

When video signal recording is performed, the selection switch 50 is switched to the a side. As a result, the vertical sync signal VS is supplied as the reference phase signal to the motor servo circuit 14 through the terminal a of the first selection switch 51. Thus, the motor 15 is servo-controlled, and the video signal SA can be recorded. The video signal generated from the recording amplifier 18 is supplied to a read/write gap R/W-1 or R/W-2 through the terminal a of the second selection switch 52 via a recording switch 48. For this reason, the recording operation of the video signal SA is enabled.

When data recording is performed, the selection switch 50 is switched to the terminal b side. As a result, the data sync signal DS is supplied as a reference servo phase signal to the servo circuit 14 through the terminal b side of the first selection switch 51. Thus, the motor 15 is servo-controlled, and data can be recorded. The data signal generated from the recording amplifier 36 is supplied to the read/write gap R/W-1 or R/W-2 through the terminal b side of the second switch 52 via the recording switch 48, thereby enabling the recording operation of the data signal SB.

As described above, in the circuit shown in FIG. 9, when a signal is supplied from external equipment, image and data recording can be quickly switched, and a video or data signal can be recorded. When the circuit shown in FIG. 9 is applied to an electronic camera which can perform recording on a cue track, a TV sync signal obtained by the TV sync circuit 42 can be supplied to the video signal generator 44. The data sync signal can be supplied to the data signal generator 45 from the data sync circuit 43.

A switching control timing of the selection switch 50 can be determined by supplying a control signal synchronous with the PG pulse in the same manner as in FIG. 7. When data recording is performed, if the recording switch 48 is switched at an arbitrary timing using the PG pulse as a reference clock, sector recording and the like can be performed.

A fifth embodiment of the present invention, i.e., an embodiment comprising a means for successively recording on a single track and a means for recording different images in a single frame will be described hereinafter. In general, when 5 to 10 frames of images per second are successively photographed, 5 to 10 frames of films are consumed in a camera using a silver halide film. On the other hand, in an electronic camera, tracks are changed by moving a head 5 to 10 times per second in the radial direction of a disk, so that time-series still images are recorded on different tracks. In the silver chloride camera, when desired data of 10 successively formed data is to be kept, the best frame selected from the 10 series frames is printed, and remaining frames can be disposed. However, in the electronic camera, even when needless frames are erased, the erased frames still remain on the disk. For this reason, when frames are displayed on a CRT, needless frames undesirably become eyesores. That is, needless frames remain on a disk in addition to the best frame, resulting in inconvenience. In order to overcome such an inconvenience, such a disk can be editted by using two decks for duplication. However, when such editting is performed, image quality is degraded in duplication, and in addition, two decks must be prepared, thereby increasing cost.

A situation requiring a successive image recording mode in an electronic camera or the like is considered. Although a large number of frames may be required in some cases such as sequence photography, as for normal usage, image recording is started before an event occurs so as not to miss a picture opportunity, and when the event occurs, the operation is stopped. Therefore, when an image recording method which can perform erase and recording operations is used, frames (tracks) need not be changed. When the above-mentioned composite magnetic head and erase/recording control system are used, a successive image forming operation will be realized in a single track.

Meanwhile, when the composite head and the erase/recording control system are utilized, one track of image data recorded in two tracks is erased, and thereafter, another image data can be newly recorded on the erased portion, thus realizing double recording of different images in a single frame.

Figure 10:
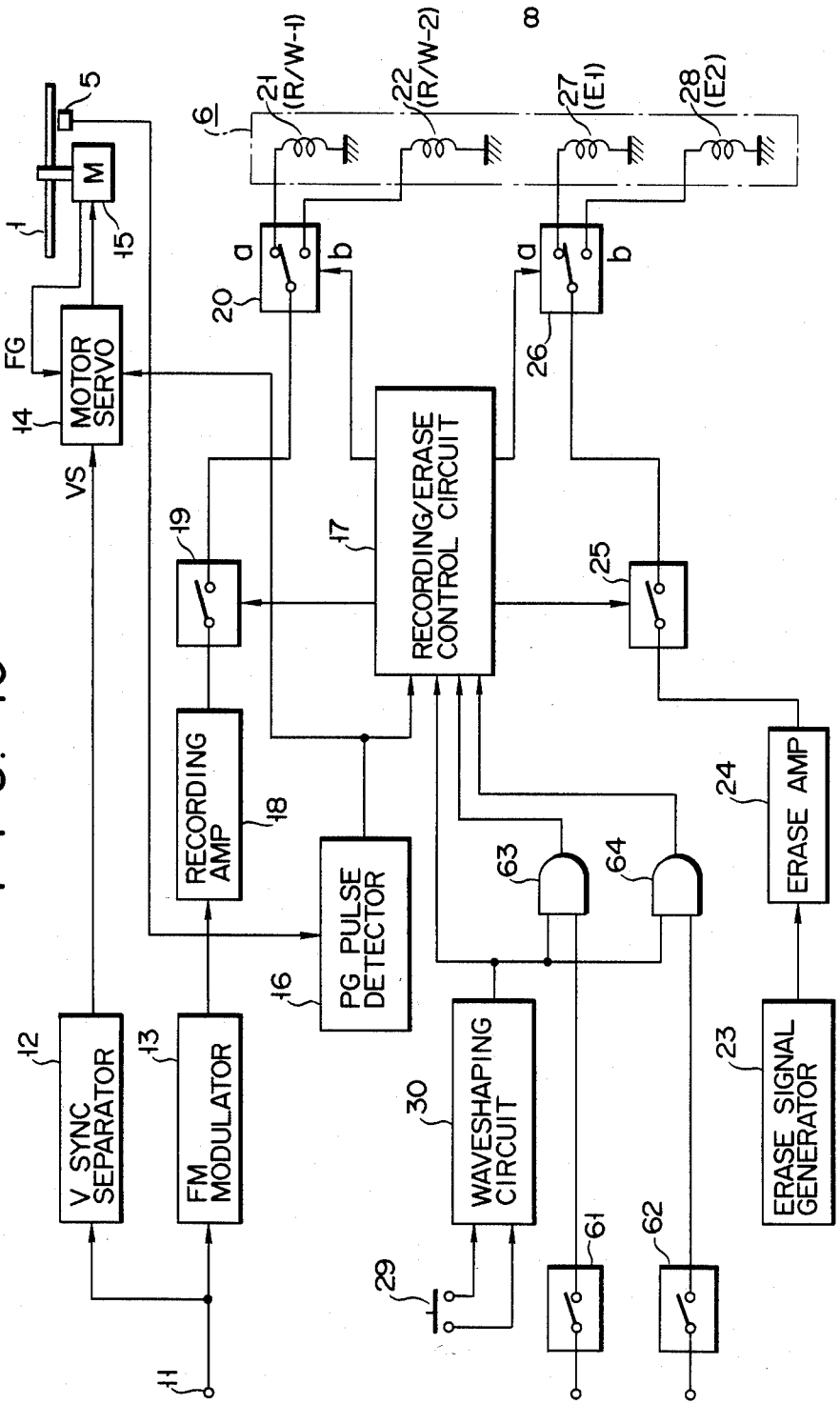

FIG. 10 is a block diagram showing an arrangement of a control system according to the fifth embodiment of the present invention based upon the above consideration, i.e., shows an arrangement of the control system which can perform a double recording operation. A difference between the circuit of FIG. 10 and that of FIG. 5 is that a successive image recording instruction switch 61 and a double recording instruction switch 62 are provided, AND outputs between these switch outputs and an output from a waveshaping circuit 30 are obtained by AND gates 63 and 64, and the AND outputs are supplied to a recording/erase control circuit 17 as a successive image recording instruction signal and a double recording instruction signal, thereby causing the control circuit 17 to perform the successive image recording or double recording operation.

A case will be described first wherein the successive image recording operation is performed. The control circuit performs switching control of switches 20 and 26 at reception of a PG pulse in the same manner as in FIG. 5. When the successive image recording is not performed, the switch 25 is first turned ON during a 2-field period, and the switch 26 is switched at every field so as to alternately activate erase gaps E1 and E2, thereby performing the erase operation for each field. Subsequently, the switch 19 is turned ON during a 2-field period, and the switch 20 is switched at every field so as to alternately activate read/write gaps R/W-1 and R/W-2, thereby performing a frame-recording operation for each field. When the successive image recording operation is performed, while an operation instruction switch 29 such as a release switch is continuously turned ON, the erase/recording cycle is repeated in the order of the erase operation and the recording operation, and the recording content of the last cycle is left as data of the successive image recording operation even when the operation instruction switch 29 is turned OFF.

Figure 11:
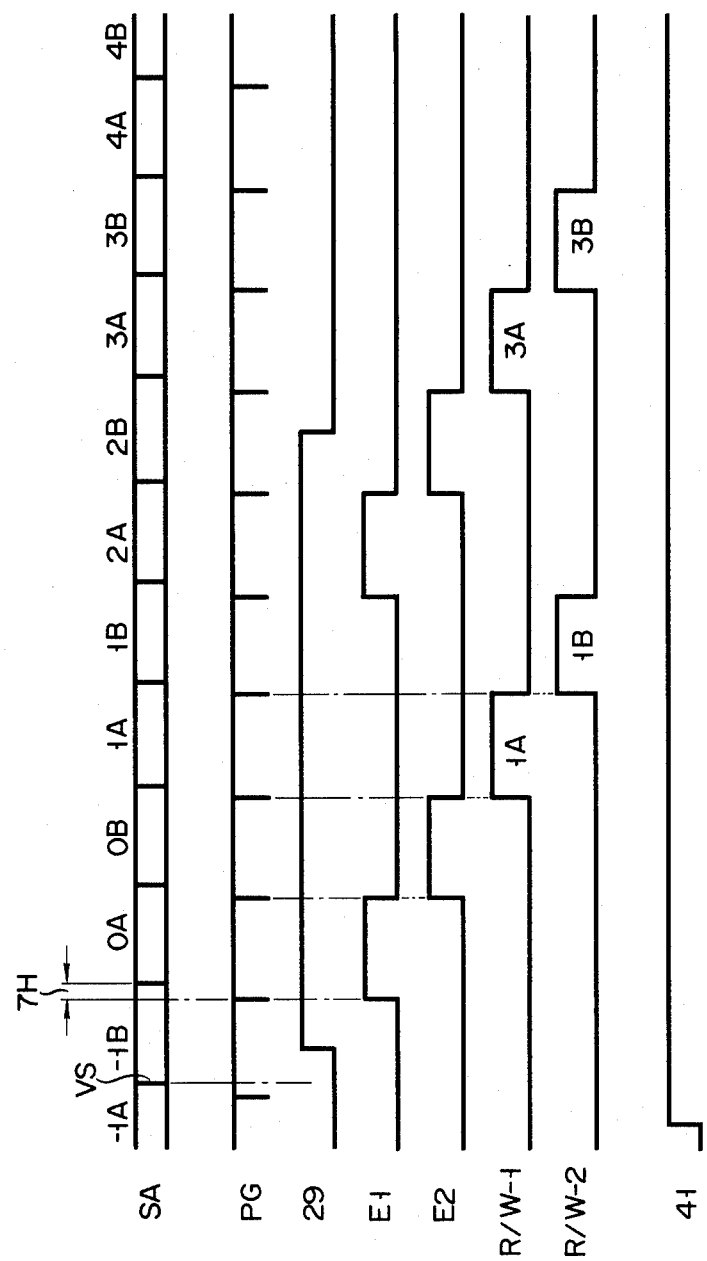

FIG. 11 is a timing chart showing the successive image recording operations. As shown in FIG. 11, frames of the video signal SA have 2-field configurations, e.g., −1A, −1B, 0A, 0B, . . . The PG pulse is advanced by 7 H from each vertical sync signal VS.

In the state wherein the successive image recording instruction switch is turned ON and the successive image recording mode is selected, when the operation instruction switch 29 is turned ON, the operation instruction signal is supplied to the recording/erase control circuit 17. Thus, the switch 25 is turned ON in response to the PG pulse supplied immediately thereafter, and the switch 26 is switched to the terminal a side. The erase operation by the erase gap E1 is initiated immediately before an A field (the latter half of a B field), and the first track T1 is erased during one revolution.

In the example of FIG. 11, since the operation instruction signal is supplied in the field −1B, the erase operation by the erase gap E1 is performed from a latter half portion of the field −1B to a latter half portion of the field 0A. Note that in the above example, the erase operation is performed during one revolution, but can be performed during two or more revolutions. When the erase operation by the erase gap E1 is ended upon operation of the switches 25 and 26, the switch 26 is switched to the terminal b side in response to the PG pulse, and the erase operation by the erase gap E2 is performed during one revolution, thereby erasing the second track T2 as well as the first track. The switch 25 is turned OFF in response to the next PG pulse rising in the latter half portion of the field 0B, and at the same time, the switch 19 is turned ON. In addition, the switch 20 is switched to the terminal a side. Therefore, the recording operation by the read/write gap R/W-1 is carried out. In other words, the gap R/W-1 records the video signal of the field 1A in the first track T1. When the next PG pulse rises in the latter half portion of the field 1A, the switch 20 is switched from the a side to the b side, and the recording operation by the gap R/W-2 is performed. That is, the gap R/W-2 records the video signal of the field 1B in the second track T2. In this manner, a cycle of erase/recording operation is ended, and the video signals of fields 1A and 1B are recorded in the first and second tracks T1 and T2.

If the successive image recording instruction switch 61 is turned OFF, when the operation instruction switch 29 is turned ON once, the above-mentioned operation is performed and the recording operation is ended. Therefore, the head 6 is moved so as to perform the recording operation with respect to the tracks T3 and T4, or the head is not moved and is set in a standby mode so as to perform reproduction by the read/write gaps R/W-1 and R/W-2. In the case of the electronic camera, a reproduction signal is supplied to an electronic viewfinder or the like.

In the embodiment of FIG. 11, since the successive image recording instruction switch 41 is kept ON, presence/absence of the operation instruction signal by the operation instruction switch 29 is checked for each field. Only when the operation instruction signal is present, is another erase/recording cycle enabled. As shown in FIG. 11, since the operation instruction signal is present until the middle portion of the field 2B, another erase/recording cycle is allowed. In this manner, the fields 3A and 3B are left as the final recording data. Note that when the operation instruction signal is interrupted during the erase/recording cycle, the operation is continued up to the recording end point of this cycle and then ended. In the embodiment of FIG. 11, as long as the operation instruction switch 29 is kept ON, the erase/recording cycle is repeated. In FIG. 11, a case has been described wherein the erase/recording mode shown in FIG. 6 is used, but another mode can be used as the erase/recording mode. When the data recording is performed, continuous data rewriting in a single track is enabled in the same manner as described above.

Figure 12:
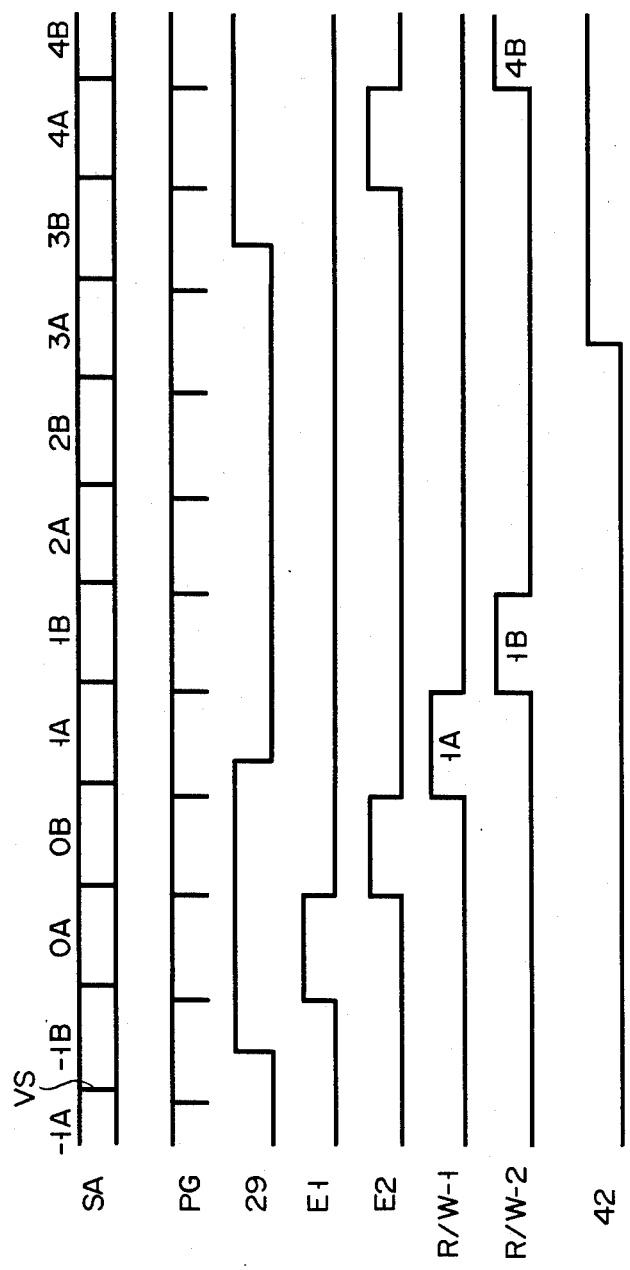

FIG. 12 is a timing chart showing the double recording operation. When the double recording instruction switch 42 is turned OFF, if the operation instruction switch is turned ON, the images of fields 1A and 1B are respectively recorded in the first and second tracks T1 and T2 in the same steps as in FIG. 11, as shown in FIG. 12. In this state, when the double recording instruction switch 42 is turned ON and the operation instruction switch 29 is turned ON again, the erase operation of the first track T1 by the erase gap E1 is not performed, and the erase operation by the erase gap E2 is performed. Then, the recording operation in the first track T1 by the read/write gap R/W-1 is not performed and the recording operation in the second track T2 by the read/write gap R/W-2 is performed. An image of the field 1A is recorded in the first track T1, and an image of the field 4B is recorded in the second track T2. Therefore, when the image data of every frame of the first and second tracks T1 and T2 is reproduced, a double exposure image of the field images 1A and 1B is reproduced.

Note that referring to FIG. 10, the switches 41 and 42 and the AND gates 43 and 44 are provided adjacent to each other so as to selectively perform successive image recording and double recording. However, an independent circuit arrangement can be adopted so that only successive image recording or double recording can be performed. In this case, the AND gates 43 and 44 are omitted, and the switch 41 or 42 is directly connected to the recording/erase control circuit 17.

The partial modifications of the above embodiments will be described hereinafter.

Figure 13:
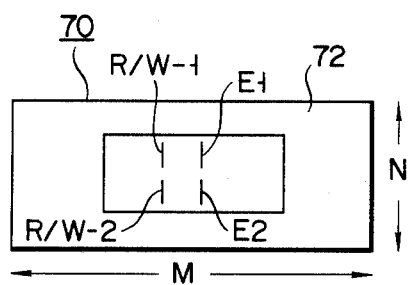
Figure 14:
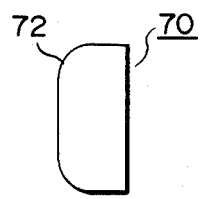
Figure 15:
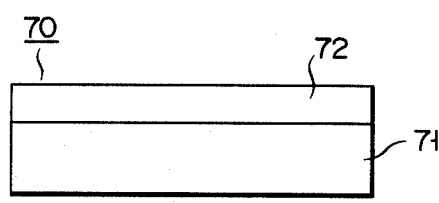

FIGS. 13 to 15 show a preferred example of the surface shape of the composite magnetic head 2 or 6. As shown in FIGS. 13 to 15, a composite magnetic head 70 is formed such that at least a disk contact surface 72, including read/write gaps R/W-1 and R/W-2 and erase gaps E1 and E2 of a head supporting base 71, is a flat surface in the longitudinal direction of the track indicated by arrow M and further is a curved surface having a given radius of curvature, e.g., 50 to 100 R in the orthogonal direction of a track as indicated by arrow N. In other words, the head supporting base 71 has a substantially U-shaped cross section. It was experimentally confirmed that the composite magnetic head 70 having such a shape can realize better head contact than other shapes.

Figure 16:
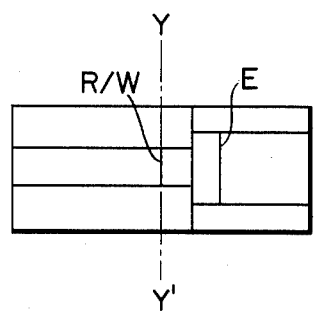
FIGS. 16 to 18 show an example of a composite magnetic head having a structure different from the composite magnetic head shown in FIGS. 2 and 4.
Figure 17:
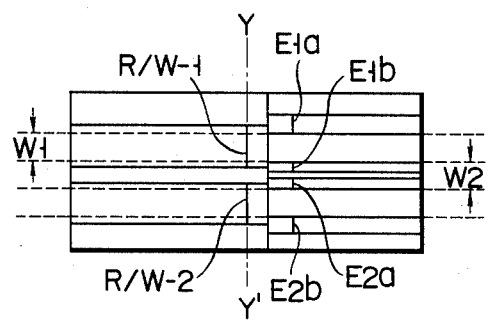
Figure 18:
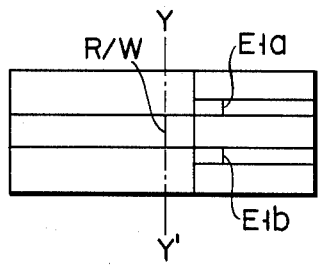

FIGS. 16 to 18 show modifications of the composite magnetic head structure. FIG. 16 shows an example of a special-purpose composite magnetic head for field recording, which has a read/write gap R/W and an erase gap E. FIGS. 17 and 18 show an example of a special-purpose composite magnetic head for data recording, in which FIG. 17 is of 2-track type and FIG. 18 is of single track type.

The composite magnetic heads shown in FIGS. 17 and 18 are of so-called tunnel erase head type, and read/write gaps R/W-1, R/W-2 and R/W are used as overwrite head gaps. Referring to FIG. 17, each of the read/write gaps R/W-1 and R/W-2 has a gap width larger than a track width W1 (60 μm), and the gaps R/W-1 and R/W-2 perform overwrite recording. A recording signal deviating from the track width W1 is erased by the erase gaps E1a and E1b or E2a and E2b for each track. In this manner, in reproduction, since the head width is larger than the track width W1, reproduction tracking is easy. However, in the above head, it is difficult to form the two erase gaps E1a and E1b within a guard band width W2 (40 μm), resulting in a complex manufacturing step.

FIG. 19 shows an example wherein an ON/OFF switch 80 is provided instead of the erase side switch 26 shown in FIGS. 5 and 10, and the erase operation can be simultaneously performed by the erase gaps E1 and E2.

FIG. 20 shows an operation timing when the control system is arranged as shown in FIG. 19. As shown in FIG. 20, the erase operations by the erase gaps E1 and E2 are performed at the same timing. Therefore, according to this modification, the erase/recording cycle can be shortened as compared to that of FIGS. 5 and 10, and 15 erase/recording cycles per second can be realized.

FIGS. 21 and 22 show an example wherein the recording side switch 20 and the erase side switch 26 shown in FIGS. 5 or 10 are arranged to be switched at the same time. However, in FIG. 22, switching directions of the switches 20 and 26 are rendered opposite by an inverter 90.

Figure 23:
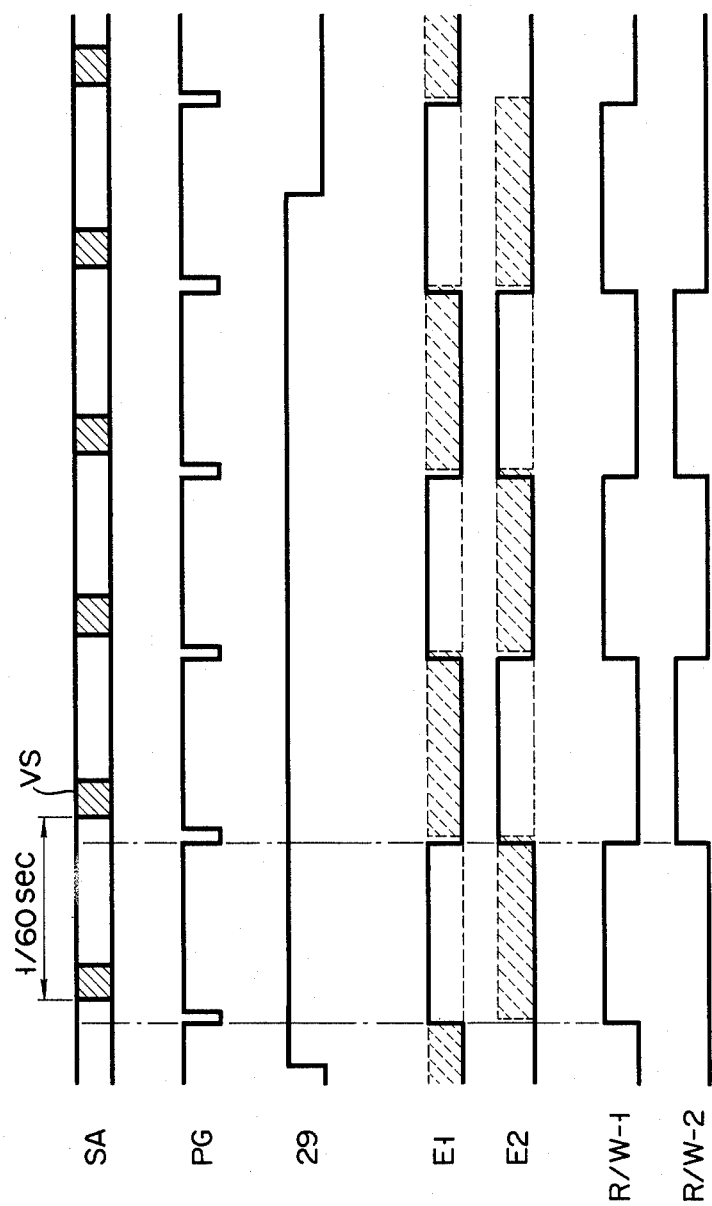
FIG. 23 is an operation timing chart when the control system is configured as in FIGS. 21 and 22.

FIG. 23 shows the operation timing of FIGS. 21 and 22. As shown in FIG. 23, the recording operation by the gap R/W-1 and the erase operation by the gap E1 or E2 (broken line) are activated during the same period. In addition, the recording operation by the gap R/W-2 and the erase operation by the gap E2 or E1 (broken line) is activated during the same period. When the gaps R/W-1 and E1 and the gaps R/W-2 and E2 are simultaneously activated, erase and recording intervals completely overlap. However, as shown in FIG. 4, the erase gaps E1 and E2 and the read/write gaps R/W-1 and R/W-2 are separated by a given distance X, and the erase operation is performed prior to the recording operation, thus causing no trouble. The recording operation is performed immediately after the erase operation. In this manner, the erase/recording operation can be performed 30 times per second in the frame recording mode and 60 times per second in the field recording mode, and the erase/recording cycle can be further shortened as compared to FIG. 19. Note that in this modification, since crosstalk between the erase and recording heads is relatively easily generated, the head of this modification preferably uses a modulation method when image data is to be recorded.

In data recording, it is a great advantage that data can be written in two tracks without the dead time of head accessing. When the head is arranged as shown in FIG. 22 and an active interval of the erase gaps E1 and E2 takes a timing as indicated by a broken line in FIG. 23, simultaneous recording/erase operation is performed in neighboring tracks. Therefore, crosstalk can be suppressed as compared to FIG. 21.

FIG. 24 shows a partial modification of the circuit shown in FIG. 7. Referring to FIG. 7, it has been explained that the sync signals VS and DS of the video signal SA and the data signal SB have the same phase. However, when they are shifted, the circuit can be arranged as shown in FIG. 24.

Referring to FIG. 24, a delay circuit 100 is provided at an output terminal of a data recording amplifier 36, and a control circuit 17 receives the data sync signal DS in addition to the vertical sync signal VS so as to control a delay amount of the delay circuit 100 in accordance with a phase difference between the signals VS and DS. Thus, in the data signal SB, the phase relationship between the sync signal DS and the PG pulse becomes the same as in the video signal SA. In this manner, the data signal SB will not be interrupted. Industrial Application Since a magnetic recording/reproduction apparatus of the present invention can be realized by adding a composite magnetic head and a simple control circuit such as commercially available, magnetic recording/reproduction apparatuses, if the apparatus is distributed on the market, a user can easily record various data such as video data with high definition and high quality by this apparatus, and can easily carry out immediate reproduction and re-recording, as needed. For this reason, the apparatus can be widely applied in various fields such as data communication, hobby, education and the like.

What is claimed is:

1. A magnetic recording/reproduction apparatus, comprising:
an apparatus main body adapted to receive a disk-shaped recording medium having a rotation center and a position detection index in a central portion of the medium to serve as a position index,
sensor means on said apparatus main body and having a detection center for detecting the rotational position of the recording medium in response to relative movement of the position detection index,
a composite magnetic head on the apparatus main body and including a head main body having an erase gap and a read/write gap, said gaps being separated form each other substantially along a moving direction relative to the disk-shaped magnetic recording medium when rotated, said erase gap being at least as wide as said read/write gap, and
wherein said read/write gap is set so as to be positioned on a line passing through the rotation center of said rotating magnetic recording medium and the detection center of said sensor menas, and said erase gap is operative selectively to erase substantially all information recorded in a track commonly aligned with said read/write gap.

2. A magnetic recording/reproduction apparatus according to claim 1, wherein in said composite magnetic head, said read/write gap is provided in a central portion of said head main body, and said erase gap is provided at a position shifted from the central portion of said head main body.

3. A magnetic recording/reproduction apparatus according to claim 1 or 2, wherein said composite magnetic head is arranged so that said erase gap is positioned at an upstream side of said read/write gap relative to a track of said rotating magnetic recording medium.

4. A magnetic recording/reproduction apparatus according to claim 1, wherein said composite magnetic head has a plurality sets of said erase and read/write gaps which are provided in parallel and spaced apart so as to correspond to at least two adjacent tracks of said rotating magnetic recording medium.

5. A magnetic recording/reproduction apparatus according to claim 1, wherein said composite magnetic head is formed so that a rotating magnetic recording medium contact surface of said head main body provided with said erase and read/write gaps is flat in the moving direction relative to said medium, and curved in a predetermined radius of curvature in a direction perpendicular to the moving direction.

6. A magnetic recording/reproduction apparatus according to claim 1, wherein said composite magnetic head includes an erase head portion having said erase gap and a read/write head portion having said read/write gap, and said erase and read/write head portions are integrally junctioned through a magnetic shield portion.

7. A magnetic recording/reproduction apparatus for use with a disk-shaped rotating magnetic recording medium, comprising:
 a composite magnetic head including a head main body having erase and read/write gaps which are provided so as to be separated from each other substantially along a moving direction relative to the rotating magnetic recording medium, and
 means for setting said read/write gaps so as to be positioned on a line passing through a center of said rotating magnetic recording medium and a detection center which is provided on said rotating magnetic recording medium as a position detection index.

8. A magnetic recording/reproduction apparatus according to claim 7, wherein the said composite magnetic head, said read/write gap is provided in a central portion of said head main body, and said erase gap is provided at a position shifted from the central portion of said head main body.

9. A magnetic recording/reproduction apparatus according to claim 7 or 8, wherein said composite magnetic head is arranged so that said erase gap is positioned at an upstream side of said read/write gap relative to a track of said rotating magnetic recording medium.

10. A magnetic recording/reproduction apparatus according to claim 7, wherein said composite magnetic head has a plurality of sets of said erase and read/write gaps which are provided in parallel and spaced apart so as to correspond to at least two adjacent tracks of said rotating magnetic recording medium.

11. A magnetic recording/reproduction apparatus according to claim 7, wherein said composite magnetic head is formed so that a rotating magnetic recording medium contact surface of said head main body provided with said erase and read/write gaps is flat in the moving direction relative to said medium, and curved in a predetermined radius of curvature in a direction perpendicular to the moving direction.

12. A magnetic recording/reproduction apparatus according to claim 7, wherein said composite magnetic head includes an erase head portion having said erase gap and a read/write head portion having said read/write gap, and erase and read/write portions are integrally junctioned through a magnetic shield portion.

* * * * *